United States Patent [19]

Shirata

[11] Patent Number: 4,787,643
[45] Date of Patent: Nov. 29, 1988

[54] ARRANGEMENT OF CANISTER-USED EMISSION CONTROL SYSTEM IN MOTOR VEHICLE

[75] Inventor: Tomonori Shirata, Yokohama, Japan

[73] Assignee: Nissan Motor Co. Ltd., Yokohama, Japan

[21] Appl. No.: 137,331

[22] Filed: Dec. 23, 1987

[30] Foreign Application Priority Data

Dec. 26, 1986 [JP] Japan .................. 61-313038

[51] Int. Cl.⁴ .............................................. B60K 15/00
[52] U.S. Cl. .................... 280/5 A; 55/385.3; 123/519; 296/198
[58] Field of Search ................... 280/5 A, 5 R, 152 B; 137/354, 355; 55/385 B, 387; 296/198; 123/518, 519, 520, 521; 180/314

[56] References Cited

U.S. PATENT DOCUMENTS 4,545,589 10/1985 Watanabe .......................... 280/5 A
4,550,923 11/1985 Ogawa et al. ...................... 280/5 A
4,727,955 3/1988 Honda et al. .................... 123/519 X

FOREIGN PATENT DOCUMENTS 60-199727 10/1985 Japan .

Primary Examiner—John A. Pekar
Attorney, Agent, or Firm—Foley & Lardner, Schwartz, Jeffery, Schwaab, Mack, Blumenthal & Evans

[57] ABSTRACT

Herein disclosed is an arrangement of a canister-used emission control system in a motor vehicle. The canister is received in a recess which is defined by a panel member of a tire wheel housing of the vehicle.

9 Claims, 2 Drawing Sheets

ARRANGEMENT OF CANISTER-USED EMISSION CONTROL SYSTEM IN MOTOR VEHICLE

BACKGROUND OF THE INVENTION

1. Field of the Invention

The present invention relates in general to an arrangement of an emission control system in a motor vehicle, and more particularly to an arrangement of an emission control system of a type which includes an activated charcoal canister.

2. Description of the Prior Art

In order to prevent the escape of fuel vapors from the fuel tank and the intake system of an internal combustion engine, evaporative emission control systems (EECS) have been widely employed in modern motor vehicles. In the systems, an activated charcoal canister is used to trap the vapors when the engine is shut off. Upon restarting, a flow of filtered air through the canister purges the vapors from the canister. The vapors go through one or more tubes (purge line) feeding into an induction passage downstream of a throttle valve of the intake system, and they are burnt in the engine.

However, the evaporative emission control systems hitherto proposed hitherto proposed fail to prevent the escape of fuel vapors when the fuel tank is under fuel feeding. In fact, during the feeding, fuel vapors escape from a mouth of a fuel filler tube.

In order to suppress or at least minimize this undesired matter, a measure of using an extra canister has been proposed, which is disclosed in Japanese Patent First Provisional Publication No. 60-199727.

This measure will be outlined in the following with reference to FIG. 3 of the attached drawings.

Numeral 1 denotes a fuel tank in which fuel "F" (gasoline or the like) is contained with a certain vapor space "S" remained thereabove. An evaporation tube 3 extending from an activated charcoal canister 5 is connected to the ceiling of the fuel tank 1 and exposed to the vapor space "S", so that fuel vapors produced in the fuel tank 1 flow in the tube 3 and is trapped by the canister 5. The canister 5 is mounted in an engine room of an associated motor vehicle. Upon restarting of the engine, the vapors in the canister 5 are purged by a flow of filtered air therethrough and fed to an intake system of the engine through a feeding tube 5a.

Denoted by numeral 4 is a ventilation tube which has one end projected into the fuel tank 1 and the other end connected to another or extra activated charcoal canister 6. The canister 6 is mounted in a rear portion of the vehicle where the fuel tank 1 is arranged. The canister 6 has a discharging tube 6a which is led to an open air. A switch valve 4a is connected to the ventilation tube 4, from which a tube 4b extends. A fuel filler tube 2 is connected at its lower end to a lower portion of the fuel tank 1. A fuel inlet opening or mouth 2a of the fuel filler tube 2 is equipped with a suitable seal device which is constructed to suppress or at least minimize the escape of fuel vapors when a fuel feeding is being carried out with a fuel feeding gun 7. As shown, the other end of the tube 4b extending from the switch valve 4a is connected to an inlet part of the fuel filler tube 2. Thus, fuel vapor-contained air led to the ventilation tube 4 is cleaned by the canister 6 before discharging into the open air.

However, the above-mentioned emission control system still has the following drawbacks originating from the position where the extra canister 6 is placed.

That is, usually, the mechanical strength of the rear portion of the vehicle body is considerably poor as compared with that of the engine room. Mounting the canister 6 to such a mechanically poor portion induces a considerable possibility of damaging or collapsing the canister 6 upon a vehicle collision, particularly when the vehicle is struck from behind. The collapse of the canister 6 is quite dangerous because it may bring about a fire.

SUMMARY OF THE INVENTION

It is therefore an object of the present invention to provide in a motor vehicle an improved arrangement of a canister-used emission control system which is free of the above-mentioned drawbacks.

According to the present invention, there is provided an arrangement of a canister-used emission control system wherein the canister is placed in a safety zone defined by a rear wheel housing of the vehicle body.

According to the present invention, there is provided an emission control system used in a motor vehicle having a floor panel, a fuel tank mounted beneath the floor panel, a side member connected to a lateral side of the floor panel and extending along the same, and a tire wheel housing constructed of a panel and secured to the floor panel through the side member. The emission control system comprises first means providing the panel of the tire wheel housing with a recess which is open to the interior of the tire wheel housing; an activated charcoal canister received in the recess; second means detachably connecting the canister to the panel; and a fuel vapor conveying tube extending from the fuel tank to the canister.

DETAILED DESCRIPTION OF THE INVENTION

Figure 1:
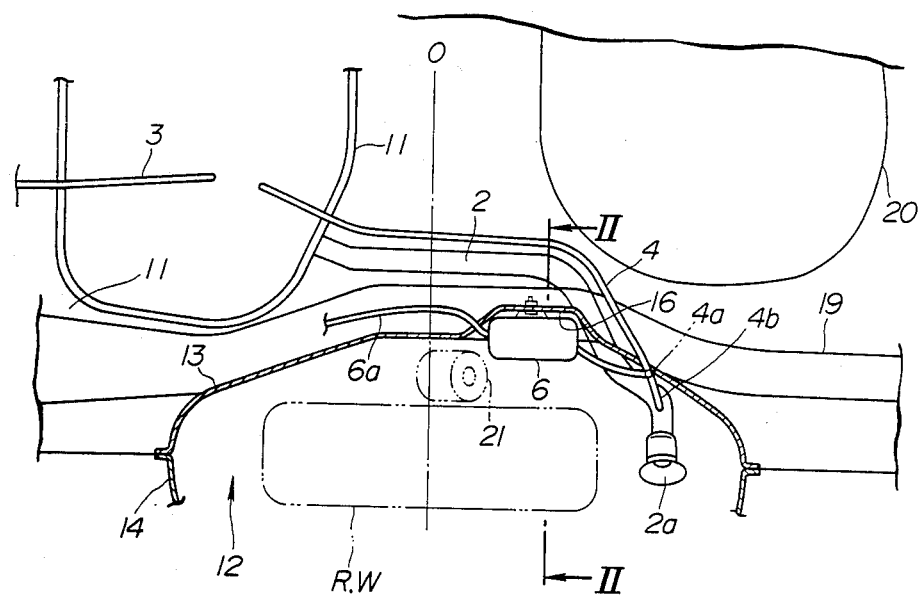
FIG. 1 is a transparent plan view of a rear left side of a motor vehicle, to which the present invention is practically applied.
Figure 2:
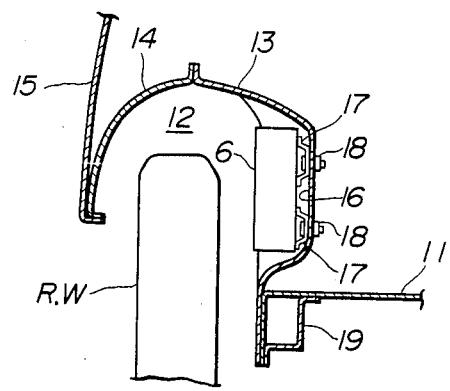
FIG. 2 is a sectional view taken along the line II—II of FIG. 2.
Figure 3:
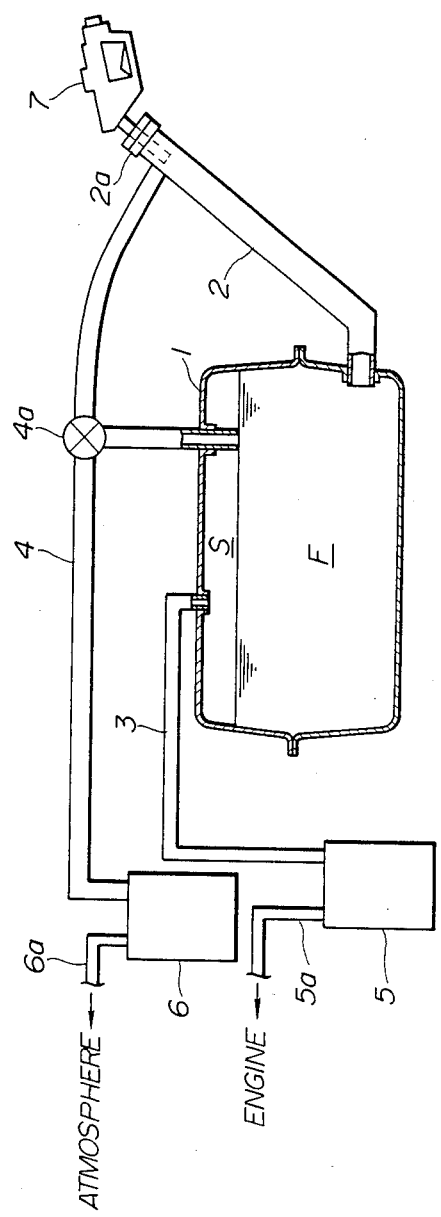
FIG. 3 is a schematic illustration of a conventional emission control system which uses two canisters.

Referring to FIGS. 1 and 2 of the drawings, there is shown a rear side portion of a motor vehicle, to which the present invention is practically applied.

Designated by numeral 1 is a fuel tank which is mounted beneath a rear floor panel 11. A fuel filler tube 2 extends rearwardly and upwardly from a lower portion of the fuel tank 1 and goes through an after-mentioned wheel housing inner panel 13 to a recessed portion (not shown) defined by a rear side fender 15 of the vehicle body. A fuel inlet opening 2a of the filler tube 2 is exposed to a space defined by the recessed portion. The inner panel 13 and an outer panel 14 are assembled to form a wheel housing 12 in which a rear left wheel (R.W) is housed. As is seen from FIG. 2, an arched portion of the rear side fender 15 is connected to an arched portion of the outer panel 14 of the wheel housing 12. The inner panel 13 of the wheel housing 12 is connected to the rear floor panel 11 through a rear side member 19 which extends along the longitudinal axis of the vehicle body. An evaporation tube 3 extends forwardly from the fuel tank 1 to a canister (not shown) mounted in a front portion (viz., engine room) of the vehicle. Although not shown in the drawings, suction and return tubes extend from the fuel tank 1 to an induction system of the engine in order to feel the engine with fuel.

Another or extra activated charcoal canister 6 is mounted in the wheel housing 12 in the following manner. That is, the canister 6 is tightly received in a recess 16 which is defined by the wheel housing inner panel 13 to face an inner side of the rear wheel (R.W). Preferably, the recess 16 is so sized as to fully receive therein the entire of the canister 6. More specifically, the recess 16 is positioned in the vicinity of an axis "O" of the rear wheel (R.W) and at a place which is higher than the ceiling of the fuel tank 1. As is seen from FIG. 2, two brackets 17 and bolts and nuts 18 are used for achieving tight connection between a bottom of the recess 16 and the canister 6. A ventilation tube 4 extends from the fuel tank 1 to the canister 6, and a tube 4b extending from an inlet part of the fuel filler tube 2 is connected through a switch valve 4a to the ventilation tube 4. A discharging tube 6a extends from the canister 6 to an open air.

Denoted by numeral 20 is a spare tire container which is defined by the rear floor panel 11, and 21 is a strut type suspension for the rear wheel (R.W).

As is described hereinabove, in accordance with the present invention, the extra canister 6 is received in the recess 16 defined by the inner panel 13 of the wheel housing 12. This means that the canister 16 is placed in a relatively safety zone of the rear portion of the vehicle. That is, the place where the canister 6 is located is effectively protected from small stones splashed by the rear wheel (R.W) during running of the vehicle. Furthermore, since the canister 6 is located in a zone which is enclosed by mechanically tough members, such as the side member 19, the strut type suspension 21 and the rear wheel (R.W), it is effectively protected even when the vehicle is struck from behind and side.

What is claimed is:

1. In a motor vehicle having a floor panel, a fuel tank mounted beneath said floor panel, a side member connected to a lateral side of said floor panel and extending along the same, and a tire wheel housing constructed of a panel and secured to said floor panel through said side member, an emission control system comprising:
first means providing the panel of said tire wheel housing with a recess which is open to the interior of the tire wheel housing;
an activated charcoal canister received in said recess;
second means detachably connecting said canister to said panel; and
a fuel vapor conveying tube extending from said fuel tank to said canister.

2. An emission control system as claimed in claim 1, in which said recess in which said canister is received is positioned in the vicinity of an axis of a tire wheel which is housed in said tire wheel housing.

3. An emission control system as claimed in claim 2, in which said recess is positioned in the vicinity of said side member.

4. An emission control system as claimed in claim 3, in which said canister is positioned at a place which is higher than a ceiling of said fuel tank.

5. An emission control system as claimed in claim 4, in which said recess is positioned to face an inner side of said tire wheel housed in said tire wheel housing.

6. An emission control system as claimed in claim 4, in which said second means comprises brackets, bolts and nuts which are assembled to secure said canister to a bottom of said recess.

7. An emission control system as claimed in claim 6, further comprising:
a switch valve operatively mounted to a portion of said fuel vapor conveying tube; and
an extra tube having one end connected to said switch valve and the other end connected to a fuel filler tube of said fuel tank.

8. An emission control system as claimed in claim 7, in which the other end of said extra tube is connected to an inlet portion of said fuel filler tube.

9. An emission control system as claimed in claim 8, further comprising a discharge tube which extends from said canister to an open air.

* * * * *